May 14, 1963   R. A. TEMPLE   3,089,598
APPARATUS FOR INVERTING LOADS
Filed July 6, 1960   5 Sheets-Sheet 4
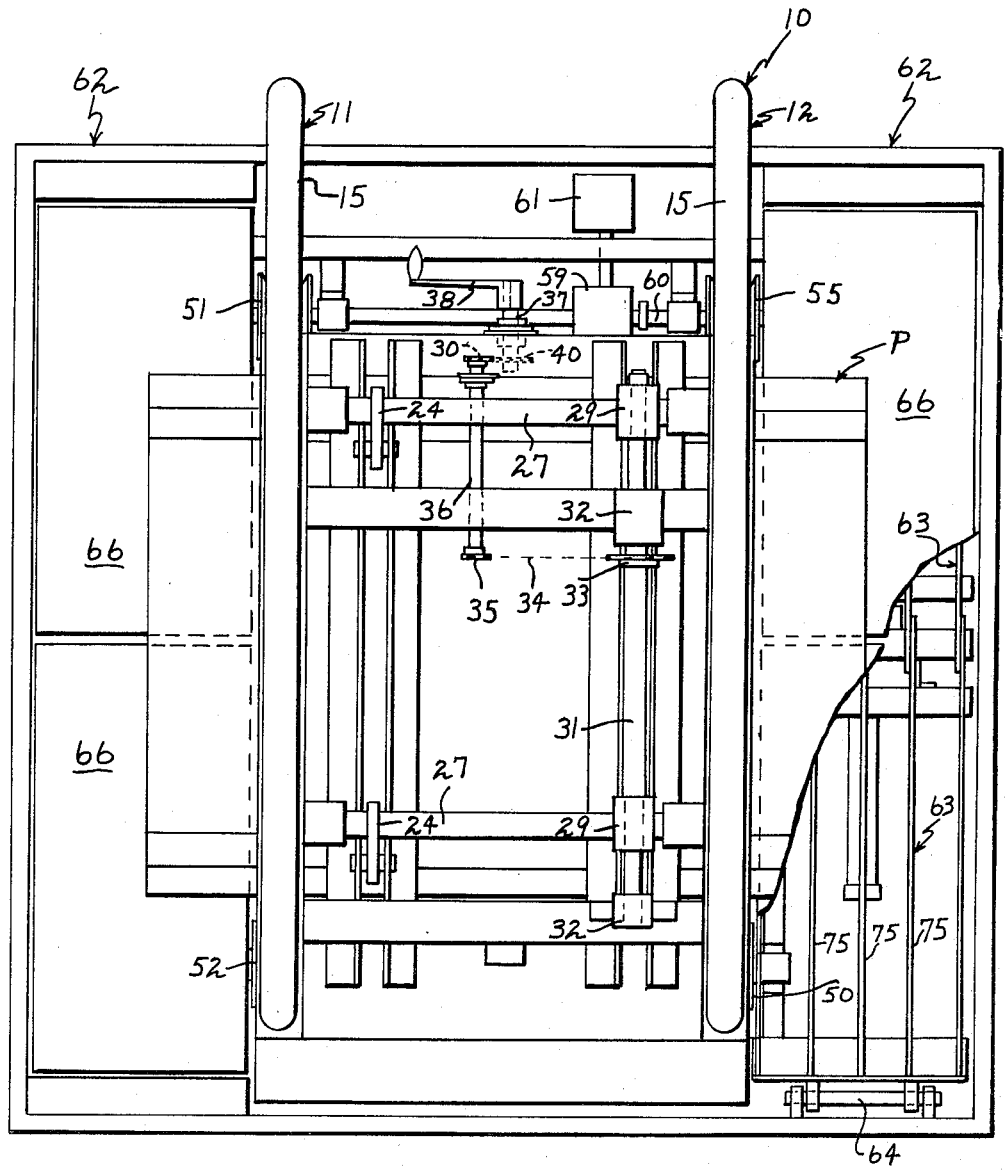
_Fig-4_
INVENTOR.
Robert A. Temple
BY
Jennings, Carter & Thompson
Attorneys May 14, 1963  R. A. TEMPLE  3,089,598
APPARATUS FOR INVERTING LOADS
Filed July 6, 1960  5 Sheets-Sheet 5

INVENTOR.
Robert R. Temple
BY
Jennings Carter & Thompson
Attorneys

United States Patent Office 3,089,598
Patented May 14, 1963

3,089,598
APPARATUS FOR INVERTING LOADS
Robert A. Temple, Birmingham, Ala.; Virginia N. Temple, administratrix of estate of said Robert A. Temple, deceased, assignor to Virginia N. Temple
Filed July 6, 1960, Ser. No. 41,207
6 Claims. (Cl. 214—1)

This invention relates to apparatus for inverting loads and more particularly to such apparatus in which means is provided to secure a load therein and to allow the load to be easily removed.

Heretofore, in apparatus for inverting loads, it has been difficult to align a load within inverting apparatus as it is normally performed by a lift truck or the like and since speed is usually of the essence, the load is normally out of alignment when positioned on the apparatus. Further, a load has been inserted, heretofore, from one or two sides of the apparatus.

The present invention provides inverting apparatus in which access to the rotary inverting frame is accomplished from three sides thereof and even though the load might not be accurately positioned, means are provided to position and hold the load securely after it has been placed in the apparatus.

It is an object of the present invention to have inverting apparatus in which a rotary inverting frame is provided with access to the frame being permitted from three sides of the apparatus thereby allowing a fork lift truck or the like to approach the frame from several directions.

A further object of the invention is to provide inverting apparatus in which a rotary load supporting frame has an upper movable horizontal platform and a rear vertical support member against which the load is positioned with means to move the upper platform simultaneously downwardly and inwardly toward the load whereby the load may be gripped between a lower support member and the upper platform. Upon unloading from an inverted position, the load may be moved away from the rear support before it is unloaded by movement of the platform on which the load is supported in inverted position. The load is rotated about substantially the center of gravity thereof so that a low power input is required.

Another object of the invention is to have a depressible floor section directly adjacent the rotary frame with the lower support member of the rotary frame being substantially flush with the floor beneath which the apparatus is inset within a well so that vehicles carrying the load may be rolled onto the apparatus and a load extending from the end of the rotary frame may be easily rotated so as not to contact the floor.

Briefly described, my apparatus comprises a load supporting frame having a pair of generally parallel C-shaped frame members with upper and lower horizontal support members connected by a vertical rear support member and with the C-shaped members being mounted in rollers. Means are provided to move the upper support member simultaneously downwardly and inwardly toward the load whereby the load may be easily secured with any desired degree of pressure applied. Means are provided on the lower support member to move the load inwardly into contact with the back or rear support. If the load is not tightly gripped and the load is somewhat out of alignment then upon inverting of the rotary frame the load will align itself against the back plate or support member. Upon unloading, the upper support member which is now in the inverted position is moved simultaneously downwardly and outwardly away from the rear support member so that the load is withdrawn from contact with the rear support member. This allows the load to be easily removed and reduces the possibility of damage to the load by coming in contact with the rear vertical support when the load is being unloaded by a fork lift truck or the like.

While my apparatus may be used for any type of loads in which it is desired to invert the loads, it has been found to work very effectively on loads of paper or board stock which have been positioned between pallets. The pallets may be easily moved by a fork lift truck or the like and the paper may be easily gripped between the pallets. Cartons of liquid food products, paints, chemicals and other products which tend to have portions thereof settle out if not inverted periodically may be used on my apparatus.

Apparatus embodying features of my invention is disclosed in the accompanying drawings, forming a part of this application, in which.

Figure 1:
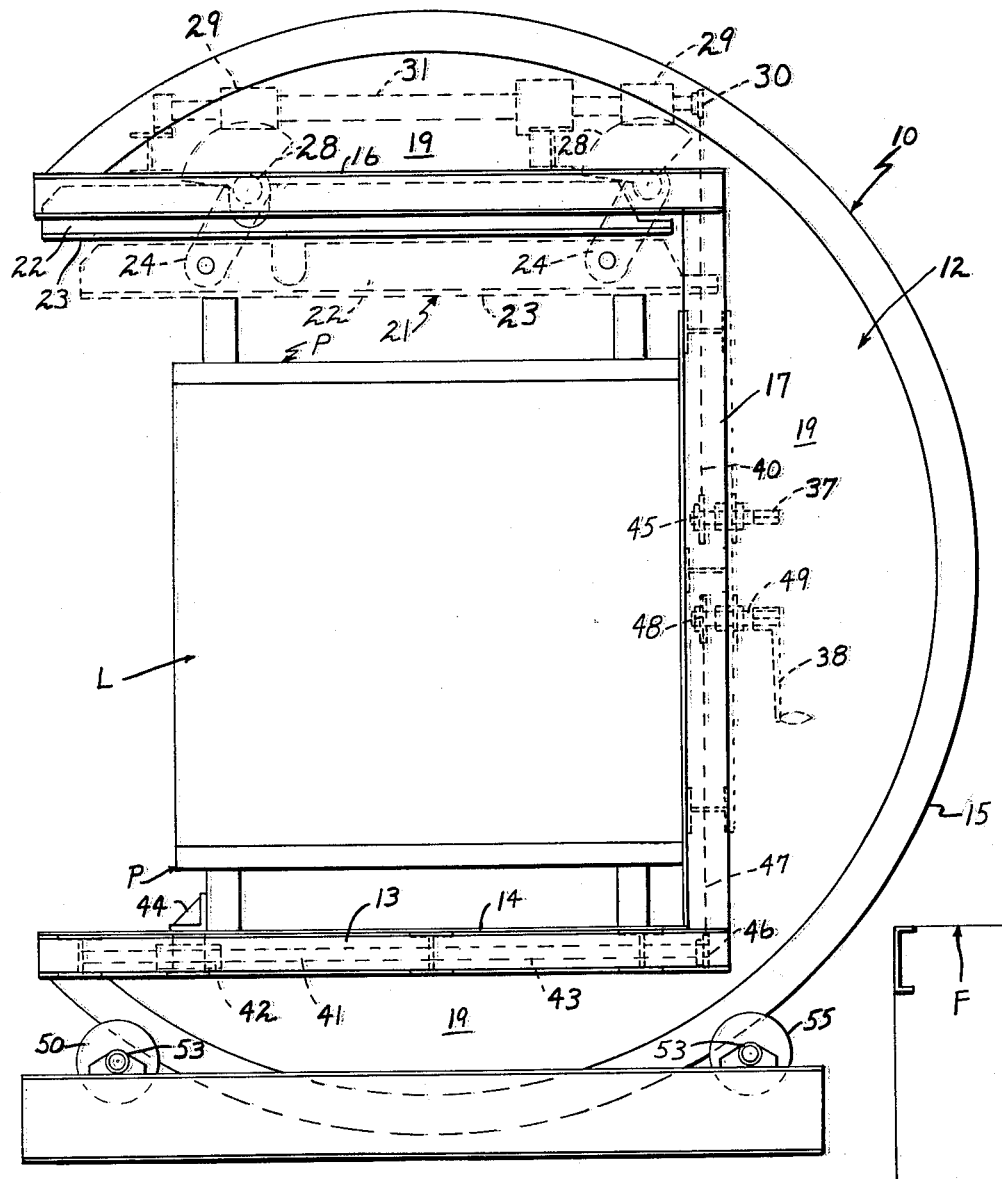
FIG. 1 is a side elevational view of my inverting apparatus in loading position with a load supported thereon between two wooden pallets or skids with the load being held between upper and lower horizontal support members and disposed adjacent the rear vertical support member.
Figure 2:
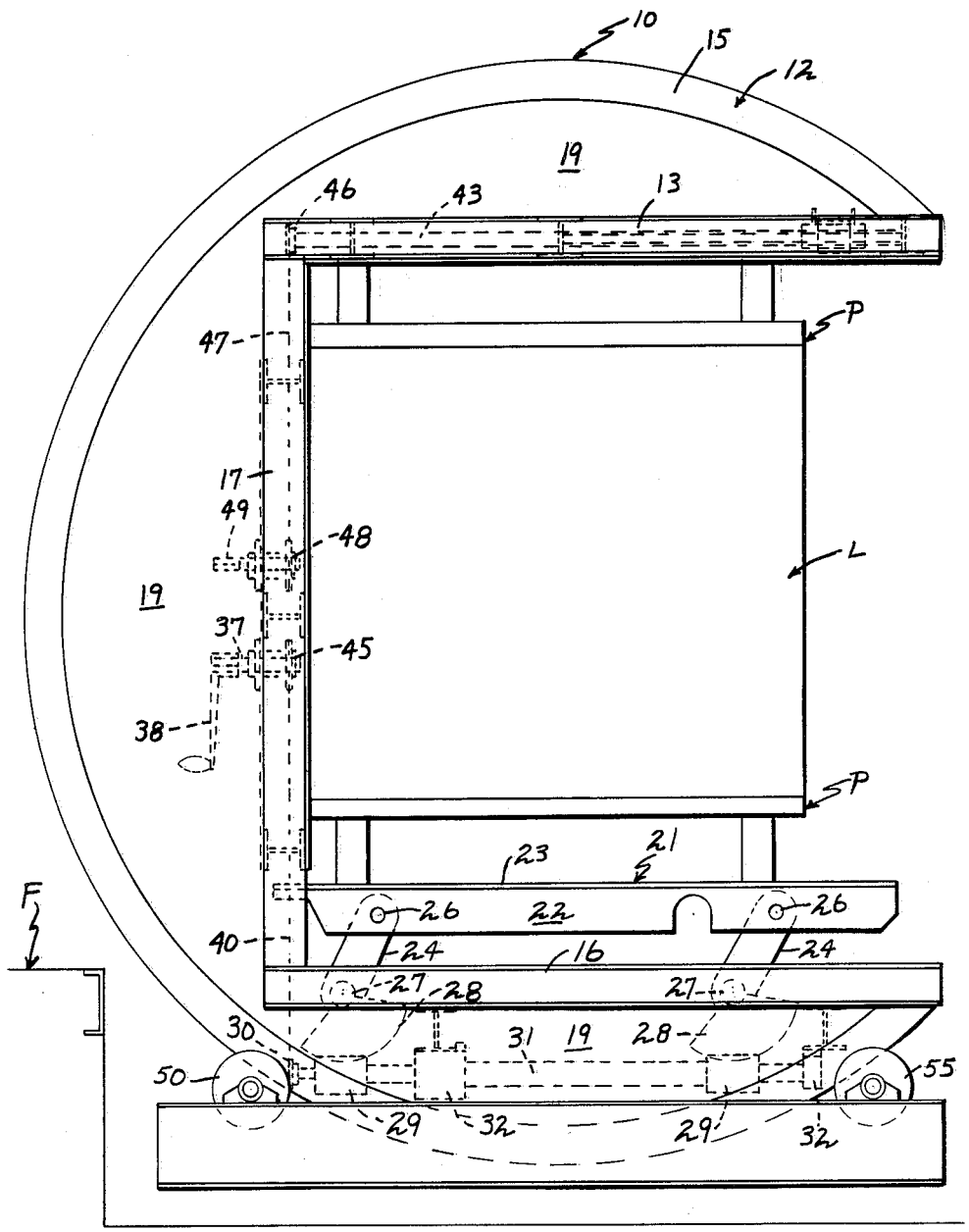
FIG. 2 is a side elevational view of the apparatus shown in FIG. 1 in unloading position after the load shown in FIG. 1 has been inverted.
Figure 3:
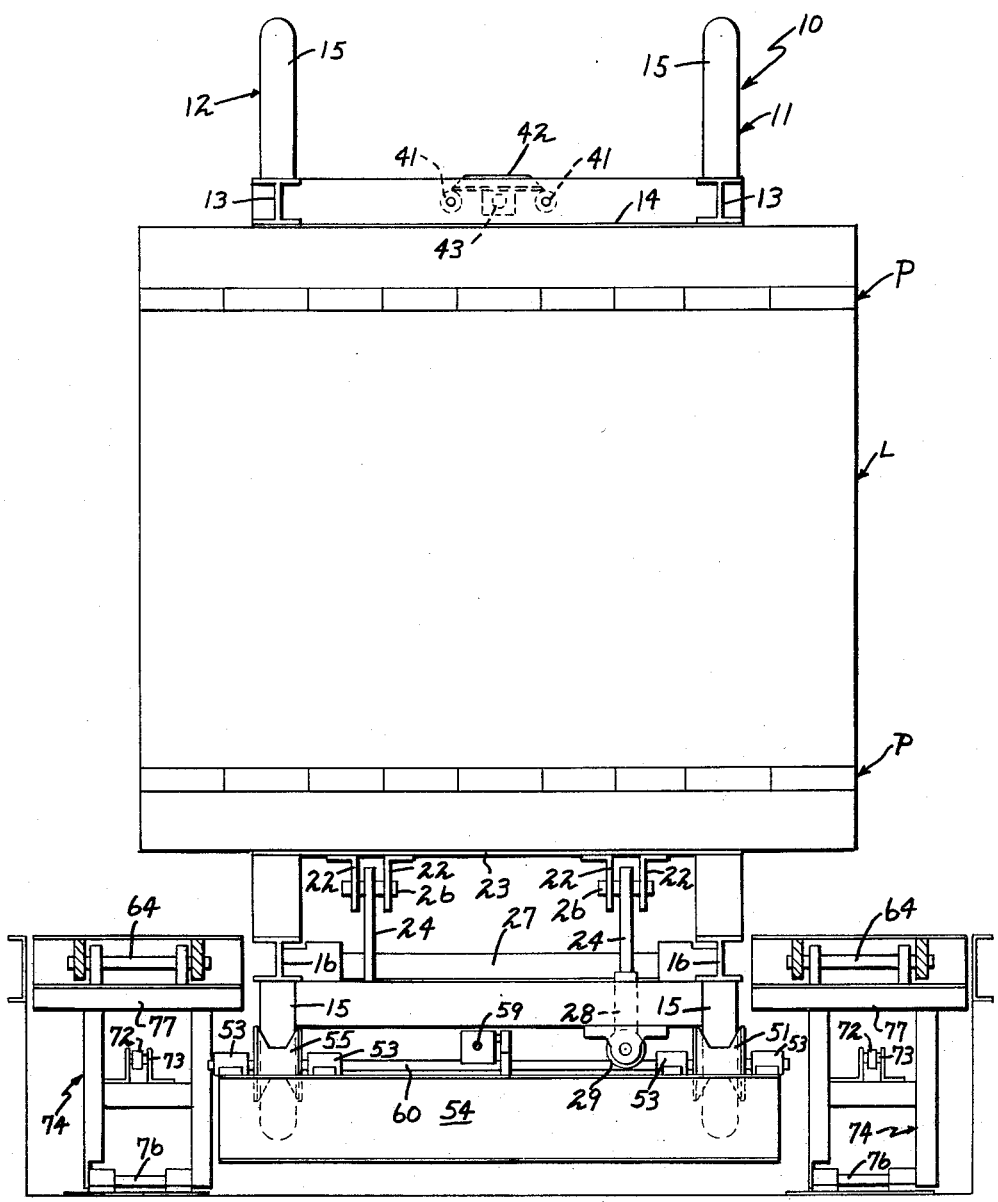
FIG. 3 is a front elevational view of the inverting apparatus shown in FIG. 2 with the load being inverted and ready to be lowered for removal, the load extending beyond the sides of the inverting apparatus and a depressible floor section shown on each side of the apparatus.
Figure 5:
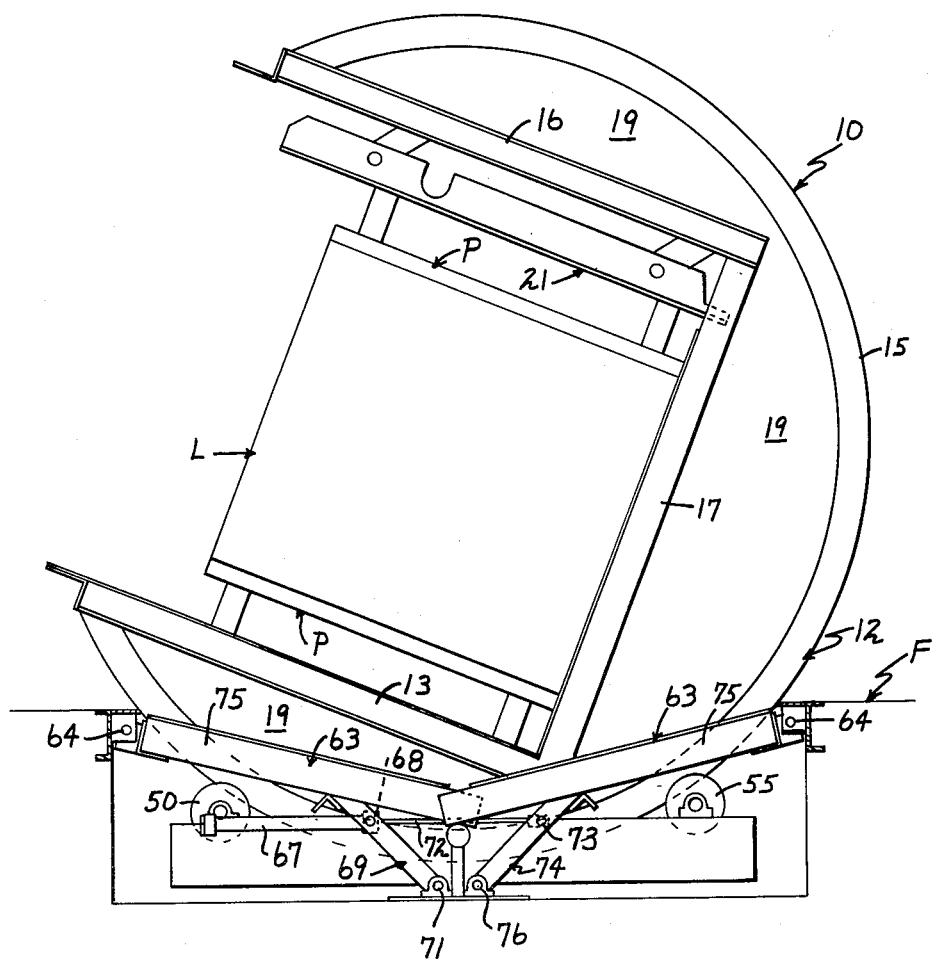

FIG. 4 is a top plan view of the apparatus shown in FIG. 1 in loading position and showing a depressible floor section on each side of the apparatus; and, FIG. 5 is a side elevational view of my apparatus which is inset in a well beneath the floor and showing the apparatus partially inverted with the depressible floor sections depressed to provide clearance for the extending ends of the load during the inverting cycle.

Referring now to the drawings for a better understanding of my invention, I show a load L comprising a plurality of paper sheets. Wooden skids or pallets P are positioned on the upper and lower surfaces of load L. Runners are positioned on pallets P and a fork lift truck may insert forks under pallets P between the runners thereof to lift the load.

A rotary supporting frame for load L is indicated generally by the numeral 10 and comprises a pair of parallel side members 11 and 12 each having a tubular C-shaped member 15. Lower support members 13 are connected by cover plate 14 which is in supporting contact with the lower pallet P. Upper support members 16 are secured to side frames 11 and 12. Vertical support members 17 extend between lower support members 13 and upper support members 16 and support the rear edge of load L to hold the load L in alignment. A plate member 19 extends between the C-shaped members 15 and the lower, upper, and rear supports.

When the loads L are positioned on my apparatus, they are frequently out of alignment and do not contact the rear supports 17. Further, it is desirable that when the loads L are loaded and unloaded that they do not contact rear supports 17 as the loads L, such as paper sheets, may become damaged. A movable platform is provided on upper supports 16 which moves the load away from rear supports 17 when the load is inverted and ready to be unloaded, in which position supports 16 are actually in the lower position. The movable platform is indicated generally by the numeral 21 and comprises angle members 22 connected by a deck plate 23. Links 24 are pivotally connected at 26 to angles 22. Links 24 are fixedly secured at their opposite ends to shaft 27 on which worm gear segments 28 are also fixed. Worms 29 engage segments 28 and are mounted on a shaft 31 which is secured in bearings 32 which in turn are secured to the frame of the rotary supporting frame 10. Shaft 31 has a sprocket 33 thereon and a sprocket chain 34 shown in diagrammatic form extending to sprocket 35 on shaft 36. Shaft 36 has sprocket 30 on the opposite end thereof which is connected by sprocket chain 40 to sprocket 45 on shaft 37. A crank 38 is adapted to fit over the extending end of shaft 37 and crank 38 may be rotated manually to move platform 21 upwardly and downwardly. After load L is positioned on lower support members 13 as in FIG. 1, shaft 31 is rotated to move platform 21 downwardly and inwardly toward the vertical rear supports 17 to grip load L. After the rotary frame 10 has been inverted and it is desired to remove load L, platform 21 with load L thereon is moved outwardly and downwardly from support 17 thereby allowing a fork lift truck or the like to remove load L without the edges or sides of the load contacting and perhaps damaging load L upon removal.

To move load L after it has been placed on lower supports 13, slide rods 41 (see FIG. 3) are provided on lower supports 14 and a crosshead 42 is adapted to slide along slide rods 41. A center screw rod 43 engages in threaded relation crosshead 42 to move the crosshead along slide rods 41. A removable angle block 44 (see FIG. 1) which is only used in loading position when it is desired to move the load toward the rear support 17 is adapted to engage a slot in crosshead 42 and is retained in the slot by gravity. After the load has been positioned the block 44 is removed. FIG. 1 shows block 44 in position and FIGS. 2–5 show block 44 removed before the load is inverted to the position shown in FIG. 2. Block 44 is adapted to engage pallet P and exert pressure thereagainst to move load L. The end of screw rod 43 has a sprocket 46 thereon. Sprocket chain 47 connects sprocket 46 and sprocket 48 secured to shaft 49. Crank 38 may be used on shaft 49 to rotate shaft 46 and thereby allow load L to be firmly positioned against rear supports 17.

To invert the rotary frame 10, rollers 50, 51, 52 and 55 are provided and have generally V-shaped grooves therein to receive the C-shaped members 15. Rollers 50, 51, 52 and 55 are mounted in bearings 53 that are secured to a fixed frame 54. C-shaped members 15 have slight variations in the gauge therebetween. Thus, rollers 51 and 52 on one side of the apparatus may move axially while rollers 50 and 55 on the other side of the frame 10 do not move axially. Thus, any slight variation in gauge of C-shaped members 15 will be taken care of. To move rotary frame 10, rollers 51 and 55 are driven by speed reducer 59 having a direct connection to shaft 60 on which rollers 51 and 55 are mounted. Speed reducer 59 is driven by a reversible electric motor 61 through a suitable connection. Thus, energizing electric motor 61 results in the driving of rollers 51 and 55 and the turning of rotary frame 10.

In order that load L may be rolled directly onto the lower supports 14, the inverting apparatus may be inset in a well below floor F so that the surface of floor F and the surface of lower supports 13 is substantially the same. When the apparatus is inset in the well, if a load L extends beyond the ends of the apparatus upon inverting the load the ends would contact the floor F. Thus, depressible floor sections are provided on each side of my apparatus and are indicated generally by the numeral 62. Each floor section 62 comprises a pair of grate portions 63 hinged at 64 and have their inner ends adapted for swinging downwardly. Cover plate 66 extends across the grate sections 63 and allows wheels of a vehicle to be moved directly onto the lower supports 13. For actuating sections 63, a fluid pressure cylinder 67 is pivotally mounted and carried at 68 by a deck support member 69 which is pivotally mounted at 71. Piston rod 72 is pivotally mounted at 73 to deck support member 74 which is pivotally mounted at 76. Supports 69 and 74 have cross members 77 thereon which engage slidably the under surface of grate sections 73. Upon actuation of cylinder 67, support members 69 and 74 move toward each other to raise grate sections 63 to horizontal relation. Grate sections 63 have grate bars 75 which overlap each other and extend beyond the cover plates 66. Thus, when one grate section 63 moves upwardly, grate bars 75 thereon may engage the under surface of cover plate 66 on the complementary grate sections 63 thereby insuring that both grate sections 63 move upwardly together into the raised position.

From the foregoing, it will be understood that I have provided apparatus for inverting a load with an upper support member being movable simultaneously downwardly and inwardly toward a rear support member so that a load may be easily held and may be moved away from the rear support in inverted position thereby to allow removal of the load without damage. By having an upper movable platform that moves downwardly and inwardly simultaneously through turning of a manual crank and the worm gear mechanism, it is possible to obtain varying degrees of application of pressure on the load. The weight of the load is not exerted against the movable platform when it is being actuated by crank 38 and thus, only a slight manual pressure is required to grip the load tightly. Further, depressible floor sections adjacent the ends of the apparatus may be provided so that the apparatus may be inset within a floor, if desired, and a load which extends from the end of the apparatus may be easily inverted without any interference from the floor.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In apparatus to invert a load mounted between pallets positioned on the upper and lower surfaces of the load, a rotary load supporting frame having an open front outer side and open ends adjacent the front side whereby a load may be positioned on the frame from either of three positions, a rear vertical support member on the frame against which the load is normally positioned, upper and lower horizontal support members on the frame between which the pallets are positioned, means to rotate the load supporting frame whereby a load between the pallets may be inverted, means on said lower support member to push the load against the rear support member, and means to move the upper support member simultaneously downwardly toward the load and inwardly toward the rear support member while remaining in horizontal relation.

2. Apparatus defined in claim 1 in which said means on said lower support member comprises a block member removably positioned on said lower support member, and means to move said block member into contact with the pallet on the lower support thereby to push the load against the rear vertical support.

3. In apparatus to invert a load mounted between pallets positioned on the upper and lower surfaces of the load, a load supporting frame having a pair of generally parallel C-shaped members which open outwardly in the loading and unloading positions of the apparatus, horizontally extending support members on the upper and lower ends of the load supporting frame between which the pallets rest, a rear vertical support member on the supporting frame remote from the open side of the C-shaped members and against which the load normally rests, rollers having grooves in which the C-shaped members are mounted, means to drive the rollers to invert the apparatus and the load, a pair of links forming a parallelogram on which the upper support member is mounted for movement, a fixed support above the movable support member in the loading position of the apparatus, a shaft on which the links are fixed, segments mounted on said shaft, and a screw feed engaging said segments to rotate said shaft and move the links whereby the upper support member is moved simultaneously downwardly toward the load and inwardly toward the rear support member in loading position and is moved simultaneously downwardly and outwardly away from the rear support member when in inverted position.

4. In apparatus inset beneath a floor and adapted to invert a load which extends from at least one end of the apparatus, a rotary load supporting frame having an open front outer side and open ends adjacent the front side with a portion of the load extending from one of the open ends, a bottom support member on the frame on which the load is positioned and being at a level substantially the same as the floor whereby a load may be easily moved from the floor onto the bottom support member, a pair of depressible members lying in substantially the same horizontal plane as the floor when in raised position and pivotally mounted at their outer opposite ends adjacent an end of the rotary load supporting frame, said depressible members meeting each other at their inner movable ends intermediate the end of the rotary frame and adapted to move downwardly at their meeting ends whereby a portion of the load extending from the rotary frame is received beneath the floor and without interference therefrom, and means to rotate the load supporting frame whereby said load may be inverted.

5. Apparatus defined in claim 4 in which each of said depressible members comprises a grate portion with a cover plate thereover, said meeting grate portions having overlapping grate bars which extend beyond the cover plates on the respective grate portions, and means to depress and raise said depressible members.

6. In apparatus inset beneath a floor and adapted to invert a load which extends from at least one end of the apparatus, a rotary load supporting frame having an open front outer side and open ends adjacent the front side with a portion of the load extending from one of the open ends, a bottom support member on the frame on which the load is positioned and being at a level substantially the same as the floor whereby a load may be easily moved from the floor onto the bottom support member, a pair of depressible members lying in substantially the same horizontal plane as the floor when in raised position and pivotally mounted at their outer opposite ends adjacent an end of the rotary load supporting frame, said depressible members meeting each other at their inner movable ends intermediate the end of the rotary frame and adapted to move downwardly at their meeting ends whereby a portion of the load extending from the rotary frame is received beneath the floor and without interference therefrom, a rear vertical support member on the frame against which the load is normally positioned, rollers on which the rotary frame is mounted, means to drive said rollers whereby said rotary frame may be inverted, and means to move the upper support member in the loading position simultaneously downwardly toward the load and inwardly toward the rear support member thereby to secure the load on the rotary frame.

References Cited in the file of this patent

UNITED STATES PATENTS

| | | |
|---|---|---|
| 2,542,660 | Glover | Feb. 20, 1951 |
| 2,596,477 | Frischmann | May 13, 1952 |
| 2,769,557 | Ohr | Nov 6, 1956 |
| 2,865,516 | Hedderich | Dec. 23, 1958 |

FOREIGN PATENTS

| | | |
|---|---|---|
| 148,895 | Sweden | Feb. 15, 1955 |